(12) United States Patent
Queveau et al.

(10) Patent No.: US 7,211,983 B2
(45) Date of Patent: May 1, 2007

(54) AMPHIBIOUS OFF-ROAD VEHICLE

(75) Inventors: Gérard Queveau, Le Pin (FR); Patrick Largeau, Cholet (FR)

(73) Assignee: Heuliez, Cerisay (FR)

( * ) Notice: Subject to any disclaimer, the term of this patent is extended or adjusted under 35 U.S.C. 154(b) by 0 days.

(21) Appl. No.: 11/065,422

(22) Filed: Feb. 24, 2005

(65) Prior Publication Data

US 2006/0186840 A1    Aug. 24, 2006

(51) Int. Cl.
*H02P 1/46* (2006.01)

(52) U.S. Cl. ............... 318/700; 705/721; 440/12.5; 440/12.55; 440/12.66

(58) Field of Classification Search ............ 318/700, 318/705, 715, 721; 440/12.5, 12.55, 12.58, 440/12.66

See application file for complete search history.

(56) References Cited

U.S. PATENT DOCUMENTS

| | | | |
|---|---|---|---|
| 4,102,292 A * | 7/1978 | Hunter et al. ............ 440/12.63 |
| 4,878,451 A * | 11/1989 | Siren ..................... 440/12.66 |
| 5,690,046 A * | 11/1997 | Grzech, Jr. .............. 440/12.5 |
| 5,842,532 A | 12/1998 | Fox et al. ................. 180/6.48 |
| 6,165,044 A * | 12/2000 | Lamar, Jr. ................. 446/427 |
| 6,439,948 B1 * | 8/2002 | Ostendorff et al. ......... 446/154 |
| 6,840,825 B1 * | 1/2005 | Messano ................. 440/12.52 |
| 2005/0020149 A1 * | 1/2005 | Bryham ................. 440/12.52 |

* cited by examiner

*Primary Examiner*—Rina Duda
(74) *Attorney, Agent, or Firm*—Nawrocki, Rooney & Sivertson, P.A.

(57) ABSTRACT

The invention concerns an off-road vehicle, in particular of the amphibious type, having a left wheel-train (6, 7, 8) and a right wheel-train, arranged to propel the vehicle on both land and water, propulsion resources (10) to drive the said wheel trains, and mobile control resources (15) capable of supplying at least one control signal as a function of their position. The said propulsion resources include a first electric motor capable of driving the left wheel-train, a second electric motor capable of driving the right wheel-train, and synchronisation resources (16) to synchronise the two electric motors as a function of the control signal.

15 Claims, 2 Drawing Sheets

AMPHIBIOUS OFF-ROAD VEHICLE

BACKGROUND OF THE INVENTION

This present invention concerns an amphibious off-road vehicle, and more particularly such a vehicle having a left wheel-train and a right wheel-train arranged to propel the vehicle on both land and water, propulsion resources to drive the said wheel trains, and movable control resources capable of supplying a control signal as a function of their position.

We are already familiar with off-road vehicles, of the 4-wheel or 6-wheel type in particular, equipped with an internal-combustion engine driving the wheels through a transmission chain. On land, the manoeuvrability of the vehicle in order to drive it in a given direction is achieved by locking one of the wheel trains and driving the other in order to steer the vehicle in the required direction.

Off-road vehicles with internal-combustion engines have a certain number of drawbacks however.

In the first place, their manoeuvrability is not optimal.

In addition, since they are off-road vehicles, they are designed to be used essentially in a rural setting. But these vehicles are noisy, and they also give rise to atmospheric pollution by the emission of exhaust gases.

We are also familiar with off-road vehicles, of the 4-wheel or 6-wheel type in particular, equipped with an electric motor.

Document U.S. Pat. No. 5,842,532 describes a six-wheeled electric vehicle for the transportation of one person. This vehicle is fitted with a left wheel-train and a right wheel-train driven by propulsion resources. However control of the motors is not optimised so as to achieve satisfactory steering accuracy. Moreover, the vehicle described does not have characteristics that would allow optimal motion on water, on slippery land, or in soft, muddy or snow-covered landscapes.

In these particular applications, control of the motors is particularly critical due to the reduced resistance of the ground to the movements of the vehicle.

SUMMARY OF THE INVENTION

This present invention aims to provide a vehicle of the amphibious type in which the noise level is reduced, exhaust gases are eliminated, and manoeuvrability is improved.

To this end, the subject of the invention is an amphibious off-road vehicle having a left wheel-train and a right wheel-train arranged to propel the vehicle on both land and water, propulsion resources to drive the said wheel trains, and movable control resources capable of supplying at least one control signal as a function of their position, where the said propulsion resources include a first electric motor capable of driving the left wheel-train, a second electric motor capable of driving the right wheel-train, and synchronisation resources provided to synchronise the two electric motors as a function of the control signal.

Thus, the use of electric motors enables both noise and atmospheric pollution to be reduced.

Furthermore, the use of two separate motors for the left and right wheel trains, together with synchronisation resources for the two motors, greatly improves the manoeuvrability of the vehicle regardless of the surface type, and in particular improves the driving accuracy of the vehicle.

In particular, the synchronisation resources allow optimal motion of the vehicle, irrespective of the different propulsion units for the wheels or the different power supplies to the motors.

Steering of the vehicle by means of a single control device also results in good manoeuvrability characteristics.

In one particular method of implementation, the said propulsion resources include two constant-ratio gearboxes, each gearbox being mounted at the output of one of the electric motors so as to drive the corresponding wheel train.

In another method of implementation, the said propulsion resources are composed of wheel-motors, where this type of motor has a high torque at low speed. Thus it is possible to dispense with gearboxes, and so to reduce the weight of the vehicle while simultaneously improving vehicle performance.

Again, in one particular method of implementation, each electric motor is arranged to drive a first wheel of the corresponding wheel train, where transmission resources are provided between the said first wheel and the other wheel(s) of this wheel train.

More particularly, the vehicle according to the invention can include a transmission chain to drive the said first wheel of each wheel train from the corresponding electric motor.

More particularly again, the vehicle according to the invention can include a transmission chain to drive one wheel of each wheel train from an adjacent wheel of the same wheel train.

In one particular method of implementation, the movable control resources include a control lever of the joystick type.

More particularly, the said control lever can include a central neutral position (A) in which no electric motor is powered, a forward position (B) in which the two electric motors are driven at maximum power, a reverse position (C) for reversing or for maximum power recovery in order to slow the vehicle, and a number of intermediate positions (D–I) in which the two motors are powered differently so that they run at different speeds and/or in different directions.

Again more particularly, the said control lever can include at least one first range of intermediate positions (F, G) in which one of the motors is stopped and the other is powered to run in a first direction so as to steer the vehicle in one direction or the other with a certain direction of movement, and at least a second range of intermediate positions (H, I) in which one of the motors is stopped and the other is powered to run in the other direction so as to steer the vehicle in one direction or the other with another direction of movement.

The said control lever can also include two lateral positions in which one of the motors is powered to run in one direction and the other motor is powered to run in the other direction so that the vehicle rotates upon itself.

In one particular method of implementation, the said electric motors are three-phase motors.

BRIEF DESCRIPTION OF THE DRAWINGS

As a non-exhaustive example, we will now describe a particular method of implementation of the invention, with reference to the appended schematic drawings in which.

DETAILED DESCRIPTION OF THE INVENTION

Figure 1:
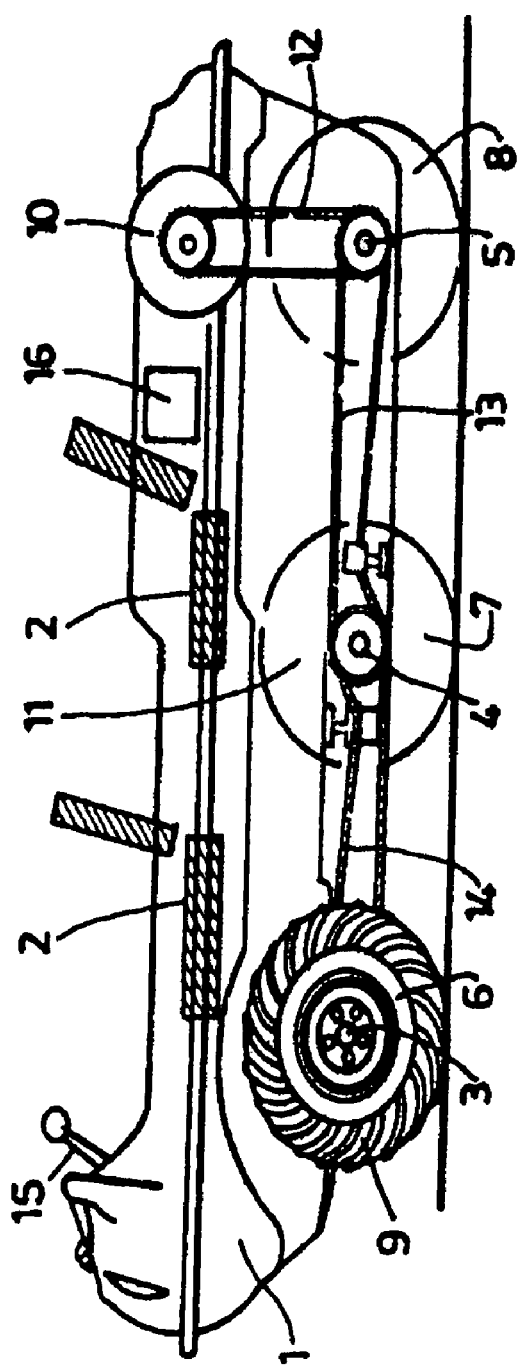
FIG. 1 is a side view, partially in cut-away, of an amphibious off-road vehicle according to one method of implementation of the invention.
Figure 3:
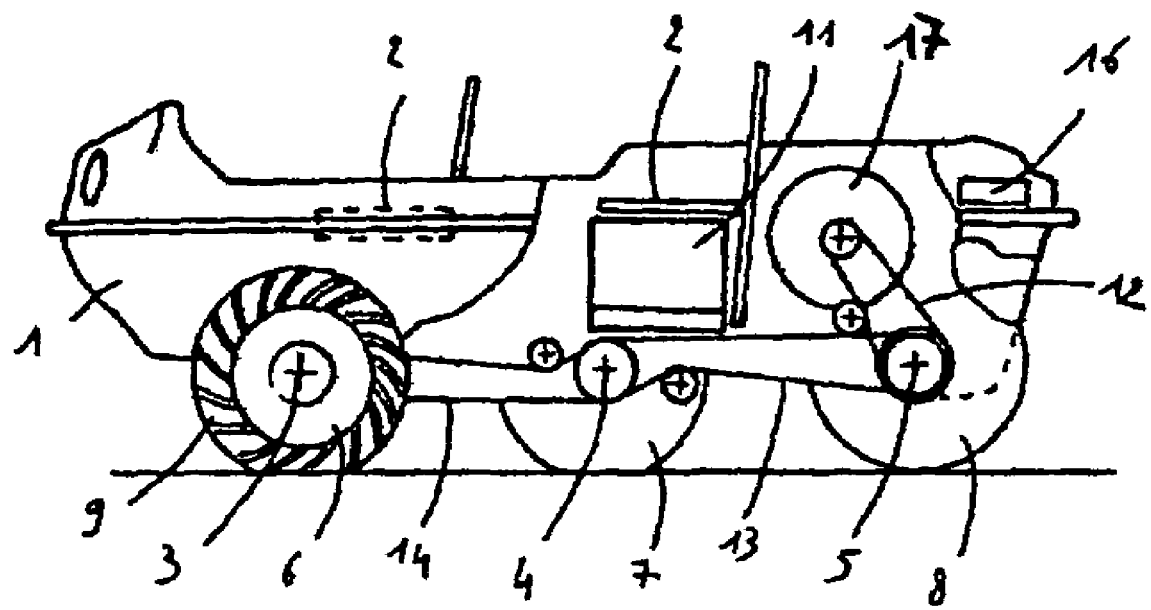
FIG. 3 is a side view of an amphibious off-road vehicle according to another method of implementation of the invention.

The amphibious off-road vehicle of FIGS. 1 and 3 has a waterproof body 1 in which two rows of seats 2 are fitted. The body 1 also has six independent axles, 3, 4 and 5 forming the left wheel-train of the vehicle, and the symmetrical axles, in relation to the symmetry plane of the vehicle, which form the right wheel-train of the vehicle.

Fitted to axles 3, 4 and 5, and to the symmetrical axles, are respectively a front wheel 6, an intermediate wheel 7 and a rear wheel 8.

In the present case, the six wheels of the vehicle are driving wheels. On land, they support and drive the vehicle in the conventional manner of an off-road vehicle. On the water, the drive is obtained by the paddle shape of the sculpturing 9 of the tyres fitted to the wheels.

According to the detailed method of implementation of FIG. 1, the body 1 supports two geared-motor assemblies 10 at its rear end, each composed of a three-phase electric motor and a constant-ratio gearbox. The electric motors are powered from a battery of accumulators 11, of the gelled lead or lithium type, located close to the centre of the body 1.

Here, the battery 11 has a voltage of less than 60 volts, to ensure safety in amphibious mode.

The geared motor 10 corresponding to the left wheel-train drives the left rear wheel by means of a transmission chain 12 placed between two drive pinions, one fitted to the drive shaft of geared-motor 10 and the other to axle 5. In like manner, drive chain 13 is placed between two drive pinions fitted to axles 4 and 5 to drive wheel 7, and chain 14 is placed between axles 3 and 4 to drive the front wheel 3.

Of course any other method of transmission could be used instead of chains 12, 13 and 14. For example, transmission chains 12, 13, and 14 can be replaced totally or partially by belt drives.

It can be seen that both the gearbox of the geared motor 10 and transmissions 12, 13 and 14 can have a constant gear ratio, since the torque of the motors can be dimensioned so as to dispense with a stepped-ratio transmission.

In order to improve steering accuracy, and to simplify the mechanisms constituting the propulsion resources, another method of implementation of the invention is proposed.

Figure 4:
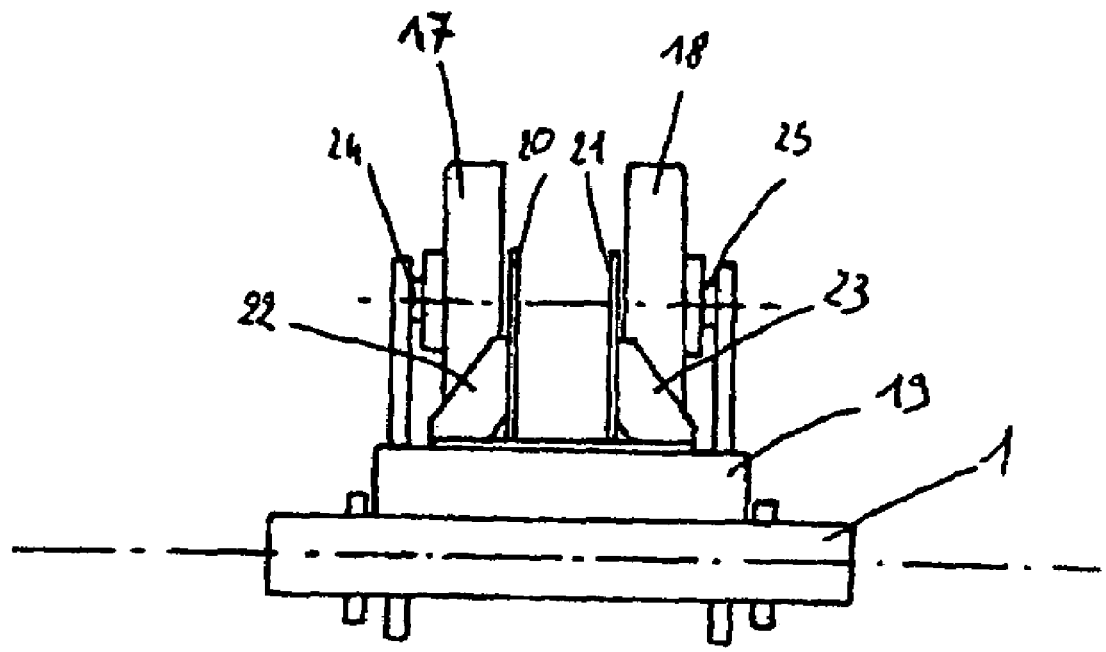
FIG. 4 is a rear view of the propulsion resources according to the method of implementation represented in FIG. 3.

According to this other method of implementation, represented in FIGS. 3 and 4, the electric motors used are waterproof wheel-motors 17, 18. The wheel-motors are permanent-magnet electric motors whose thickness is relatively low in relation to their diameter.

Here, wheel-motors 17 and 18 can be motors from the "e-wheel" series manufactured by PML Flightlink Ltd. More particularly, the motors used are the EW3030 type.

The technical characteristics of the EW3030 motor are as follows:

Max voltage: 72 V
Nominal torque (continuous average): 80 Nm
Peak torque: 320 Nm
Torque coefficient (Kt): 1.37 Nm/A
Back-emf coefficient (Ke): 0.144 V/t/mn
Induced resistance: 0.061 ohms at 20° C.
Thermal resistance: 5.053 W/degree
This type of motor has many advantages.

In fact this type of motor has a high torque at low speed. Thus, contrary to the method of implementation represented in FIG. 1, the propulsion resources do not have any gearboxes.

The speed of rotation of wheel-motors 17, 18 can be set with a very high accuracy. As a consequence, the two wheel-motors marked 17 and 18 driving each wheel train can be synchronised with a very high degree of precision.

Moreover, wheel-motors 17 and 18 have an excellent output and a high delivered power-to-weight ratio.

Finally, wheel-motors 17, 18 also allow the recovery of energy during braking.

According to one preferred method of implementation, wheel-motors 17 and 18 are brushless motors, which reduce servicing and improve reliability in a wet environment.

In order to accentuate the advantages mentioned above, the motors are preferably powered from a direct-current three-phase source.

Electrical control of the motors is effected by means of an electronic control unit 16.

In one method of implementation of the invention, this electronic unit 16 is arranged so as to allow the use of all types of batteries with a voltage of between 12 V and 72 V. This unit 16 also has a phase-advance switch which is used to maximise the power output of the motors 17, 18.

FIGS. 3 and 4 illustrate the arrangement of the propulsion resources according to the second method of implementation of the invention.

A support plate 19 is fixed to the chassis 1 of the vehicle and carries two vertical plates 20, 21 for fixing of the wheel-motors 17, 18. In order to reinforce these two vertical plates 20, 21, reinforcing plates 22, 23 are placed between the support plate 19 and the fixing plates 20, 21.

The wheel-motors 17, 18 are fixed onto the vertical plates 20, 21, and the drive shafts 24, 25 of the motors 17, 18 are orientated towards the wheel trains to be driven.

The drive to wheels 6, 7 and 8 is achieved by means of transmission chains 12, 13, 14, as described previously and/or by belts.

Note that the accumulators 11 are located close to the centre of the vehicle and low down, since this improves stability on land and especially on water. In fact the batteries are quite heavy, and therefore can be used to advantage as a ballast that stabilises the vehicle when it is correctly positioned. In fact the motors 17, 18 too can fulfil the same role of stabilising ballast, either as an alternative or in addition to the batteries.

A control lever 15 of the joystick type continuously supplies two control signals in a known manner as a function of its angular position. These control signals are sent to an electronic unit 16. In the detailed method of implementation shown in FIG. 1, the electronic unit 16 provides for the synchronisation of the geared motors 10 as a function of these control signals.

According to the method of implementation illustrated in FIGS. 3 and 4, the electronic unit 16 provides for the synchronisation of wheel-motors 17 and 18.

Synchronisation of the motors can consist of synchronising the speed of rotation of the motors, using a rev-counting system attached to the wheels or the motors for example, or of synchronising the power to the motors.

The accuracy of the motor synchronisation enables a precise direction to be maintained, or a turn to be maintained accurately. Accurate synchronisation of the motors also allows pirouettes to be effected with ease, where the car spins upon itself.

Figure 2:
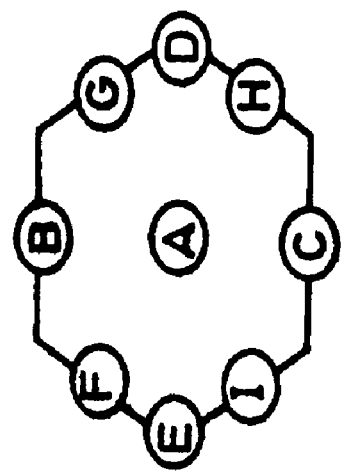
FIG. 2 illustrates the different positions of a control lever of the joystick type, used on a vehicle according to the invention.

FIG. 2 shows the different positions of the lever 15.

In position A, no motor is powered, and the vehicle is in freewheel.

In position B, the two motors are driven at maximum power, with the electronic unit 16 ensuring that they run at the same speed.

In position C, the two motors are in maximum energy recovery in order to slow the vehicle in its forward motion. This is also the reverse position. Here again, the electronic unit 16 ensures that the two motors are rotating at the same speed.

In positions D and E, one of the motors rotates in one direction and the other rotates in the other direction so that the vehicle rotates on itself.

In positions F and G, one of the motors rotates in one direction and the other is stopped, to allow rotation of the vehicle in one of its forward directions.

Finally, positions H and I correspond to positions F and G, with the working motor rotating in the other direction, so that the vehicle now turns in the other direction of movement.

In fact, positions F, G, H and I constitute intermediate ranges which are used to control the speed and the torque to be applied in order to provide the best possible handling characteristics.

Note that synchronisation of the electric motor by the use of an electronic unit 16 dispenses with the need for a differential unit.

Finally, the assembly functions with no liquid cooling, and is therefore practically maintenance free from one end to the other of the kinetic chain.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

The invention claimed is:

1. An amphibious off-road vehicle having a left wheel-train and a right wheel-train, arranged so as to propel the vehicle on both land and water, propulsion resources to drive the said wheel trains, and movable, multi-position control means capable of providing, at any particular time, one of a plurality of control signals, each as a function of the position of the control means, where the said propulsion resources include a first electric motor capable of driving the left wheel-train, a second electric motor capable of driving the right wheel-train, and synchronisation resources provided to synchronise the two electric motors as a function of the control signal.

2. A vehicle in accordance with claim 1, in which the said propulsion resources include two constant-ratio gearboxes, each gearbox being fitted at the output of one of the electric motors in order to drive the corresponding wheel train.

3. A vehicle in accordance with claim 1, in which the electric motors are wheel-motors.

4. A vehicle in accordance with claim 3, which includes an electronic unit capable of controlling the motors, the said electronic unit having a phase-advance switch used to maximise the performance of the wheel-motors.

5. A vehicle in accordance with claim 1, in which each electric motor is arranged to drive a first wheel of the corresponding wheel train, and where transmission resources are provided between the said first wheel and the others wheel(s) of this wheel train.

6. A vehicle in accordance with claim 5, which includes a transmission chain and/or a belt to drive the said first wheel of each wheel train from the corresponding electric motor.

7. A vehicle in accordance with claim 5, which includes a transmission chain and/or a belt to drive one wheel of each wheel train from an adjacent wheel of the same wheel train.

8. A vehicle in accordance with claim 1, in which the movable multi-position control means includes a control lever of the joystick type.

9. A vehicle in accordance with claim 8, in which the said control lever has a central neutral position (A) in which no electric motor is powered, a front position (B) in which the two electric motors are driven at maximum power, a reverse position (C) for reversing the vehicle or for maximum power recovery in order to slow the vehicle, and a number of intermediate positions (D–I) in which the two motors are powered differently so that they run at different speeds and/or in different directions.

10. A vehicle in accordance with claim 9, in which the said control lever has at least one first range of intermediate positions (F, G) in which one of the motors is stopped and the other is powered to run in a first direction so as to steer the vehicle in one direction or the other with a certain direction of movement, and at least a second range of intermediate positions (H, I) in which one of the motors is stopped and the other is powered to run in the other direction so as to steer the vehicle in one direction or the other with another direction of movement.

11. A vehicle in accordance with claim 9, in which the said control lever has two lateral positions in which one of the motors is powered to run in one direction and the other motor is powered to run in the other direction so that the vehicle rotates on itself.

12. A vehicle in accordance with claim 1, in which the said electric motors are three-phase motors.

13. A vehicle in accordance with claim 12, in which the said electric three-phase motors are brushless direct-current motors.

14. A vehicle in accordance with claim 1, in which the electric motors are powered from a battery of accumulators, the battery being located close to the centre of the body.

15. A vehicle in accordance with claim 1, in which the electric motors are powered from a battery of accumulators of the gelled lead or lithium type. The invention concerns an off-road vehicle, in particular of the amphibious type, having a left wheel-train (6, 7, 8) and a right wheel-train, arranged to propel the vehicle on both land and water, propulsion resources (10) to drive the said wheel trains, and mobile control resources (15) capable of supplying at least one control signal as a function of their position. The said propulsion resources include a first electric motor capable of driving the left wheel-train, a second electric motor capable of driving the right wheel-train, and synchronisation resources (16) to synchronise the two electric motors as a function of the control signal.

* * * * *